3,205,223
PROCESS AND INTERMEDIATES FOR PREPARING 2-AMINO-3-HYDROXY - 3H - 1,4 - BENZODIAZEPINES
Stanley C. Bell, Philadelphia, Pa., assignor to American Home Products Corporation, New York, N.Y., a corporation of Delaware
No Drawing. Filed Apr. 16, 1963, Ser. No. 273,277
3 Claims. (Cl. 260—239)

The present invention relates to a process for preparing 2-amino-3-hydroxy-3H-1,4-benzodiazepines.

The compounds prepared by the process sought to be patented have the formula:

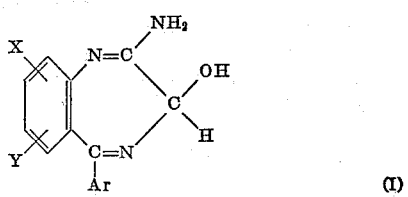

(I)

wherein Ar is an aryl radical such as phenyl, thienyl or phenyl substituted by halogen, lower alkoxy, lower alkyl or halo lower alkyl radicals; X and Y each represent halogen atoms, halo lower alkyl and lower alkyl sulfonyl radicals. These compounds are useful because of their central nervous system activity and because they are easily converted to the corresponding 1,3-dihydro-5-aryl-2H-1,4-benzodiazepin-2-ones of known pharmacodynamic activity.

The starting materials employed in the process of this invention are already known and are represented by the formula:

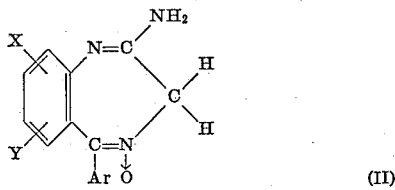

(II)

wherein X, Y and Ar have the significance above given. These compounds are prepared by converting an ortho-aminobenzophenone to its oxime with hydroxylamine, then acylating the oxime so formed with an α-haloacyl halide to produce the corresponding α-haloacylamino-benzophenone oxime, followed by dehydrating the latter product with a strong acid to give a compound having a quinazoline ring structure. Reacting this latter compound with ammonia or a primary amine causes a rearrangement with the result that the quinazoline ring structure is enlarged to the 1,4-benzodiazepine structure shown in Formula II.

The process of this invention comprises heating to a temperature of about 70 to about 140° C., a compound of Formula II, above, with a lower alkane monocarboxylic acid anhydride such as acetic anhydride to form a 2-acyl-amino-5-phenyl-3H-1,4-benzodiazepin-3-one. This compound then is added, with stirring, to a suspension of lithium aluminum hydride, or of sodium borohydride-aluminum chloride in ether, tetrahydrofuran, or, in a similar inert solvent. After completion of the reaction, water is added to decompose any unreacted hydride. The solution is filtered and then evaporated, leaving behind the desired product which may be purified by recrystallization from cyclohexane and benzene or other suitable organic solvent.

The above-outlined process is illustrated schematically below:

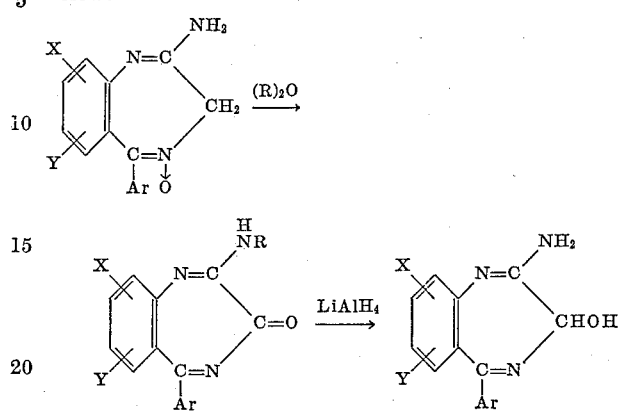

In the above equation, X and Y are as above stated and R is a lower alkane monocarboxylic acid acyl radical.

The following examples illustrate the practice of the invention.

Example 1

(1) A mixture of 15.0 g. 2-amino-7-chloro-5-phenyl-3H-1,4-benzodiazepine 4-oxide and 300 ml. of acetic anhydride was heated on the steam bath for one hour. The reaction mixture turned red. After cooling there was filtered off 2-acetamido-7-chloro-5-phenyl-3H-1,4-benzodiazepin-3-one, M.P. 239–240°.

*Analysis.*—Calc'd. for $C_{17}H_{12}ClN_3O_2$: C, 62.67; H, 3.71; N, 12.90; Cl, 10.88. Found: C, 62.37; H, 3.70; N, 12.27; Cl, 10.60.

(2) To a suspension of 1.0 g. of lithium aluminum hydride in 75 ml. of ether was added with stirring 0.9 of 2-acetamido-7-chloro-5-phenyl-3H-1,4 - benzodiazepin - 3-one. After 0.5 hour the reaction mixture was cautiously treated with water to decompose the excess hydride and the ether was filtered from the solids. Evaporation of the ether followed by several recrystallizations of the residue from cyclohexane and benzene gave 2-amino-7-chloro-3-hydroxy-5-phenyl-3H-1,4 - benzodiazepine, M.P. 181–183°.

Example 2

2-amino-7-chloro-5-(o-chlorophenyl) - 3H - 1,4 - benzodiazepine 4-oxide is treated with propionic anhydride according to the procedure of Example 1 to give 7-chloro-5-(o-chlorophenyl)-2-propionamido-3H-1,4 - benzodiazepin-3-one which upon treatment with LiAlH₄ yields 2-amino-7-chloro-5-(o-chlorophenyl)-3-hydroxy - 3H - 1,4-benzodiazepine.

Example 3

2-amino-5-(p-methoxyphenyl)-3H-1,4 - benzodiazepine 4-oxide is treated with acetic anhydride as in Example 1 to give 2-acetamido-5-(p-methoxyphenyl)-3H-1,4-benzodiazepin-3-one which upon treatment with LiAlH₄ yields 2-amino-5-(p-methoxyphenyl)-3-hydroxy-3H-1,4 - benzodiazepine.

Example 4

2-amino-5-(2-thienyl-3H-1,4-benzodiazepine 4-oxide is treated with acetic anhydride as in Example 1, to give 2-acetamido-5-(2-thienyl)-3H-1,4-benzodiazepin-3-one which upon treatment with LiAlH₄ yields 2-amino-3-hydroxy-5-(2-thienyl)-3H-1,4-benzodiazepine.

Example 5

2-amino-7-bromo-5-phenyl-3H-1,4-benzodiazepine 4-oxide is treated with acetic anhydride as in Example 1, to give 2-acetamido-5-phenyl-3H-1,4-benzodiazepin-3-one, which upon treatment with LiAlH₄ yields 2-amino-3-hydroxy-5-phenyl-3H-1,4-benzodiazepine.

In the same manner as above described are also prepared 2-amino-3-hydroxy-7-methylsulfonyl-5-(m-tolyl)-3H-1,4-benzodiazepine; 2-amino-3-hydroxy-5-(o-methoxyphenyl)-7-trifluoromethyl-3H-1,4-benzodiazepine; and 2-amino-7,8-dimethyl-3-hydroxy-5-phenyl-3H-1,4-benzodiazepine.

What is claimed is:

1. The process which comprises bringing into reactive contact at a temperature ranging from about 70 to about 140° C. a compound having the formula:

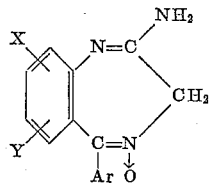

wherein Ar is an aryl radical selected from the group consisting of phenyl, thienyl, and phenyl bearing as a substituent a member of the group consisting of halogen, lower-alkoxy, lower-alkyl and halo-lower-alkyl, and lower-alkyl sulfonyl radicals, with a lower-alkane monocarboxylic acid anhydride of the formula $$(R)_2O$$

wherein R represents a lower alkane monocarboxylic acid acyl radical, to form a compound of the formula:

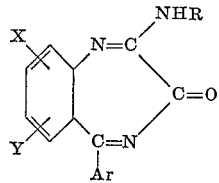

and treating the latter compound in an inert solvent with a reagent selected from the group consisting of lithium aluminum hydride and sodium borohydride-aluminum chloride to form a compound having the formula:

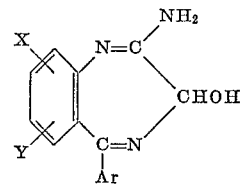

wherein the substituents are as above stated.

2. The process which comprises bringing into reactive contact at a temperature ranging from about 70 to about 140° C. a compound having the formula:

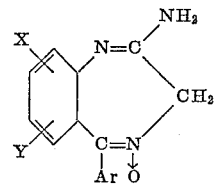

wherein Ar is an aryl radical selected from the group consisting of phenyl, thienyl, and phenyl bearing as a substituent a member of the group consisting of halogen, lower-alkoxy, lower-alkyl and halo-lower alkyl, and lower-alkyl sulfonyl radicals, with a lower-alkane monocarboxylic acid anhydride of the formula $$(R)_2O$$

wherein R represents a lower-alkane monocarboxylic acid acyl radical, to form a compound of the formula:

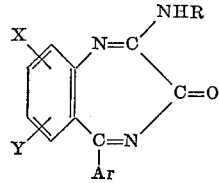

and separating the latter compound from the reaction mixture.

3. 2-acetamido-7-chloro-5-phenyl-3H-1,4-benzodiazepin-3-one.

References Cited by the Examiner

UNITED STATES PATENTS 3,051,701  8/62  Reeder et al. _____ 260—239

NICHOLAS S. RIZZO, *Primary Examiner.*